(12) United States Patent
Uchida

(10) Patent No.: US 7,191,238 B2
(45) Date of Patent: Mar. 13, 2007

(54) METHOD AND SYSTEM FOR AUTHENTICATING CONTENT DISTRIBUTION AND CONTENT REPRODUCTION REQUESTS BASED ON BIOMETRIC FEATURES

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 512 days.

(21) Appl. No.: 09/840,269

(22) Filed: Apr. 24, 2001

(65) Prior Publication Data

US 2001/0035814 A1 Nov. 1, 2001

(30) Foreign Application Priority Data

Apr. 27, 2000 (JP) ............................. 2000-128193

(51) Int. Cl.
G06F 15/16 (2006.01)
H04K 1/00 (2006.01)
G06K 9/00 (2006.01)

(52) U.S. Cl. ...................... 709/229; 709/217; 713/186; 382/115

(58) Field of Classification Search ........ 709/200–203, 709/217–219; 713/186, 193; 705/51–52
See application file for complete search history.

(56) References Cited

U.S. PATENT DOCUMENTS

| | | | | | |
|---|---|---|---|---|---|
| 5,964,830 | A | * | 10/1999 | Durrett ........................ | 709/200 |
| 6,061,795 | A | * | 5/2000 | Dircks et al. ............... | 713/201 |
| 6,557,054 | B2 | * | 4/2003 | Reisman ...................... | 710/33 |
| 6,618,806 | B1 | * | 9/2003 | Brown et al. ............... | 713/186 |
| 6,711,610 | B1 | * | 3/2004 | Harris ......................... | 709/217 |
| 6,769,009 | B1 | * | 7/2004 | Reisman ..................... | 709/201 |
| 2001/0016836 | A1 | * | 8/2001 | Boccon-Gibod et al. ...... | 705/51 |
| 2001/0027520 | A1 | * | 10/2001 | Mori ........................... | 713/186 |
| 2001/0051925 | A1 | * | 12/2001 | Kang ........................... | 705/51 |
| 2002/0069362 | A1 | * | 6/2002 | DeMont ...................... | 713/193 |
| 2002/0133412 | A1 | * | 9/2002 | Oliver et al. ................. | 705/26 |
| 2003/0105720 | A1 | * | 6/2003 | Ishibashi ...................... | 705/52 |

FOREIGN PATENT DOCUMENTS

| | | |
|---|---|---|
| JP | 63-13226 | 3/1988 |
| JP | 4-33065 | 2/1992 |

(Continued)

OTHER PUBLICATIONS

Hiroki EDA, "Sony Develops a Fingerprint Checking Device Which Stores a Secret Key", Nikkei Electronics, Feb. 22, 1999, No. 737, pp. 33-34.

*Primary Examiner*—Wen-Tai Lin
(74) *Attorney, Agent, or Firm*—Sughrue Mion, PLLC

(57) ABSTRACT

A user terminal including a fingerprint sensor is connected via a network to a content distribution server. The server includes at least a fingerprint-feature comparing unit and a specified content distributor. The fingerprint-feature comparing unit accesses a registered user information table in which personal information regarding a user, a user identification, and fingerprint feature information, and reads therefrom fingerprint feature information of a person who requests a content distribution so as to compare the fingerprint feature information with fingerprint feature information of the person inputted from the user terminal. The specific content distributor distributes a requested content to the user terminal only when match is made as a result of comparison. The content can therefore be distributed via a network with higher reliability and safety.

11 Claims, 7 Drawing Sheets

FOREIGN PATENT DOCUMENTS

| | | |
|---|---|---|
| JP | 11-96363 | 4/1999 |
| JP | H11-175726 A | 7/1999 |
| JP | H11-312201 A | 11/1999 |
| JP | 2000-92046 A | 3/2000 |
| JP | 2000-115646 A | 4/2000 |
| WO | WO 99/26373 A1 | 5/1999 |

* cited by examiner

F I G. 7
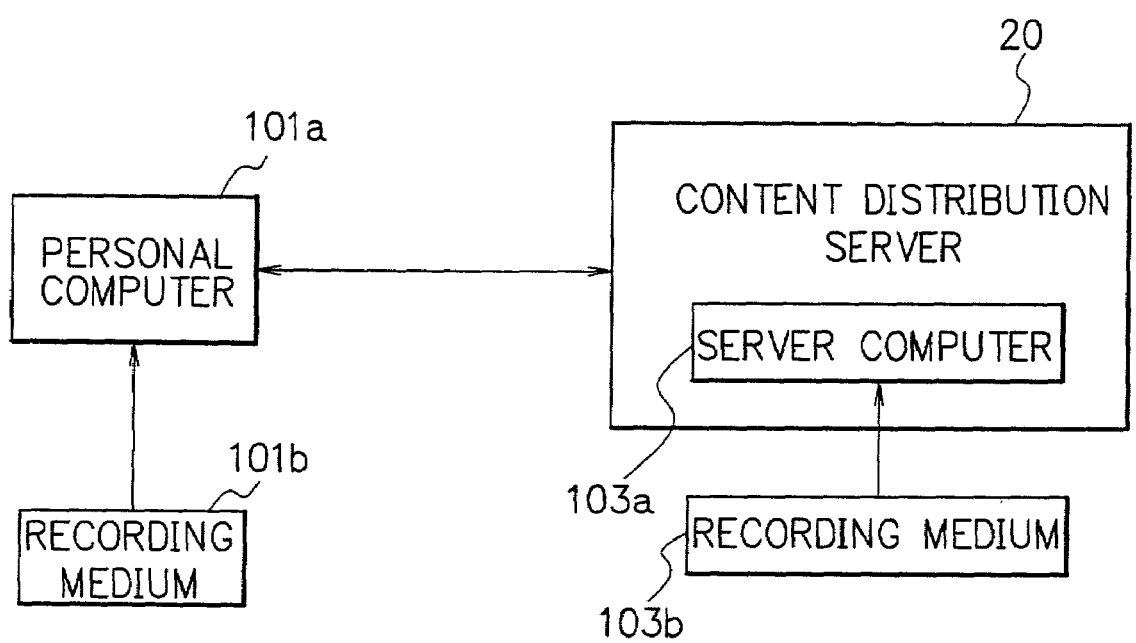

METHOD AND SYSTEM FOR AUTHENTICATING CONTENT DISTRIBUTION AND CONTENT REPRODUCTION REQUESTS BASED ON BIOMETRIC FEATURES

BACKGROUND OF THE INVENTION

The present invention relates to a method and system for distributing via a network to a user, so-called digital contents such as music, an electronic game, an application software, and news items. The present invention also relates to a server and a user terminal constituting the content distribution system and to a recording medium for storing thereupon a program to execute distribution of contents.

With a progress and development of communication networks, a service to distribute digital contents including music, electronic game, application software, and news items via networks to users is increasingly put to practical use. Conventional way of acquiring such contents for a user is to go to a record store to purchase a compact disk (CD) containing information related to the music. When the user desires to obtain an electronic game, he or she goes to a specialty store to buy a compact-disk read-only memory (CD-ROM) on which information related to the game is recorded. Recently, it is possible for the user to acquire such items as follows. Distributing company or a provider sends digital data of the requested item, from a provider's server to a user terminal connected via a network, so that the user can use that data and pay for a price of the obtained item in one of convenient ways.

One of the content distribution systems to distribute contents via a network to the user is as follows. User uses as a terminal equipment, a personal computer, a game machine, a television set, a mobile telephone such as a portable personal assistant or the like owned at home, and issues an order request from that terminal to the provider. Upon reception of the order request, the provider transmits to the user terminal digital data related to the request of the user.

If a user does not have such a terminal, he or she issues an order from a terminal for common use installed, for example, in a convenience store. The provider sends, upon reception of the order, pertinent digital data to the shared terminal. This is another type of a content distribution system. In this situation, if the news items have been ordered, the user reads these news items displayed on the shared terminal. In a case where music or an electronic game has been ordered, the user connects his or her own portable terminal or a recording medium to the shared terminal to transfer digital data distributed from the provider to the shared terminal.

In a content distribution via a network, particularly, in a content distribution via a terminal such as a user terminal which cannot handle money, some kind of means is required for the user to pay for the obtained item. According to a prior art technique, a user inputs information such as a number of his or her credit card, that is necessary for the payment. The order reception side confirms if the user is solvent or not, according to the input information and thereafter distributes contents of the ordered item to the user. This procedure has the possibility that a third person sneaks a look at a number of the credit card. If this happens, there is the possibility that the third person passes himself off as a card holder and fraudulently receives the distributed service using a number of the credit card.

There is another way of distributing a content. That is, the orderer (a user side) and those who receives the order agree on a payment procedure in advance so that information necessary for the payment such as a password, a pin number, a credit card number, a bank account number, and the like are previously registered. When a user issues an order, he or she inputs such confidential information as the registered pin number and the password for identification of the user. If it is confirmed, the order receiving side distributes a content related to the ordered item. However, this method has a disadvantage that a third person obtains confidential information by stealing a glance at the information or having a guess at it, thus passing himself off as said person without difficulty.

In the prior art method, because of insufficient identification of the user, it is difficult to prevent a fraudulent reception of distribution by a third person with evil intent.

Apart from the illegal reception of a distributed content, the content distribution side desires to restrict utilization of distributed contents. For example, it is necessary to protect intellectual property rights concerning music software products, software game products, and an application software. For this purpose, it is desired to place a limit on utilization of distributed contents. The content distributing side therefore allows only a user who has paid for a price to use the distributed item, thus preventing illegal copy of the products. However, since the prior art method has insufficient user identification, this kind of restriction cannot be absolutely accomplished. Therefore, proposition to accomplish such restriction has been desired.

Prior art technique has another problem that, when a shared terminal installed in a store or the like is used as a user terminal to receive a distributed content, a processing required for issuing an order becomes complicated. This is because such shared terminal installed in a store has functions to deal with a wide variety of contents. When a user uses the terminal, the user is required to specify individual content by selecting it from among many items. For example, the user should specify his or her desired artist and the name of music for a music item, the kind of game for a game item, and for news items, a category and the date and time of news should be specified. Operations required are therefore considerably complicated.

To gain access to the news using the shared terminal, a user reads in some cases a financial column first, then a sports column, and finally a column of show business, and the like. In this case, the user is required to repeatedly conduct the same operation for each category. This is quite troublesome for the user. For inputting such items, operations are carried out through the use of a key board and selection buttons combined, a touch panel, and the like. This is quite difficult for the user to operate.

An electronic mail from person to person and an electronic magazine from a person to many registered subscribers to the magazine can also be regarded as a kind of contents. It can be considered that a user operates an information terminal at a place where he or she is staying, for example in a store, to read confidential information such as a mail or a mail magazine destined for the user or to download the information into his or her own device. This situation also arises a problem of complexity associated with confirmation of a user identification and specification of the objective information.

One of the known methods to identify a user with high accuracy is based on biological features called biometrics. This method uses features obtained by measuring biometrics of a person, for example, a fingerprint, for personal identification. Japanese Patent Application Laid-open No. 11-96363 describes a settlement method using a fingerprint for authentication. In this settlement method, a user's fingerprint read by a fingerprint reader at the time of the settlement is compared or verified with fingerprint data previously registered so as to identify the user.

However, there has been no content distribution via a network, to which the personal identification using a fingerprint is applied. Moreover, by simply applying such identification to the content distribution, it is not possible to solve the problem associated with complexity of processing and the problem related to restriction of utilization of distributed contents.

SUMMARY OF THE INVENTION

It is therefore an object of the present invention to provide a content distribution method and a content distribution system capable of realizing personal identification by which those who has requested distribution of contents can be surely identified using biometrics. Furthermore, it is an object of the present invention to provide a method and system by which the contents can be distributed via a network or the like with higher reliability and safety.

Another object of the present invention is to provide a content distribution method and a content distribution system capable of restricting utilization of contents and providing safety distribution of contents.

It is still another object of the present invention to provide a content distribution method and a content distribution system capable of setting up a user interface which alleviates troublesome operations and facilitates user operation.

It is another object of the present invention to provide a recording medium having recorded thereon a program which can implement a server and a user terminal to constitute the content distribution system and can execute content distribution.

To achieve the objects above in accordance with one aspect of the present invention, there is provided a content distribution method comprising the steps of measuring a first biometric feature of a person who requests a content distribution; performing a first comparison between first information associated with said first biometric feature obtained by the measurement and second information associated with biometric features of registered users which have been previously registered; distributing a content only when match is made as a result of said first comparison; measuring at the time of reproduction of the content distributed in said content distribution step, a second biometric feature of a person who requests a content reproduction; performing a second comparison between third information associated with said second biometric feature obtained by the measurement and said first information; and allowing reproduction of said content only when match is made as a result of said second comparison.

In accordance with one aspect of the present invention, there is provided a content distribution method comprising the steps of registering specific personal information, a user identification, and biometric feature information regarding a user, in a registered user information table by making a connection therebetween; obtaining a user identification of a person who requests a content distribution and attaining from said registered user information table first biometric feature information of said person based upon said user identification; measuring biometric features of said person and obtaining from said biometric feature second biometric feature information; performing a comparison between said second biometric feature information and said first biometric feature information read from said registered user information table; and distributing a required content only when match is made as a result of said comparison.

In accordance with another aspect of the present invention, content distribution method comprising the steps of distributing a content to a user terminal and accumulating the content therein; measuring at the time of reproduction of said accumulated content, biometric features of a person who requests a content reproduction; performing a comparison between biometric feature information associated with said biometric feature obtained by the measurement and biometric feature information of a registered user which has previously been registered; and allowing reproduction of said content only when match is made as a result of said comparison.

In accordance with one aspect of the present invention, there is provided a content distribution method comprising the steps of: connecting a portable user terminal to a shared service terminal which is connected via a network to a content distribution server, so as to input from biometric feature input means equipped in said portable user terminal biometric features of a user who uses said portable user terminal; performing a predetermined encryption processing on biometric feature information associated with said biometric feature inputted from said means; transmitting said encrypted biometric feature information to said content distribution server via said shared service terminal; performing a predetermined decryption processing on said encrypted biometric feature information received by said content distribution server; performing a comparison between said encrypted biometric feature information and biometric feature information of a registered user which has previously been registered; and distributing a content to said shared service terminal only when match is made as a result of said comparison.

In accordance with one aspect of the present invention, a content distribution method is provided, which comprises the steps of registering a user identification to identify a user and biometric feature information of the user in a registered user information table by making a connection therebetween, and registering terminal setup data to personalize a user terminal and said user identification in a terminal personalization setup data table by making a connection therebetween; measuring biometric features of a person who requests a content distribution; reading a user identification of said person from said registered user information table according to biometric feature information associated with said biometric feature obtained by said measurement; reading terminal setup data regarding said person from said terminal personalization setup data table, according to said user identification read from said registered user information table; and personalizing said user terminal used by said person, according to said terminal setup data.

In accordance with one aspect of the present invention, there is provided a content distribution method comprising the steps of registering a user identification to identify a user, biometric feature information of a user, a biometric feature identification to identify said biometric feature information, and a terminal setup data to personalize a user terminal in a terminal personalization setup data table, by making a connection therebetween; measuring biometric features of a person who requests a content distribution; reading a user identification and a biometric feature identification of said person from said registered user information table, according to biometric feature information associated with said biometric feature obtained by said measurement; reading, according to said user identification and biometric feature identification read from said registered user information table, terminal setup data regarding said person from said terminal personalization setup data table; and personalizing a user terminal used by said person, according to said terminal setup data.

In accordance with one aspect of the present invention, there is provided a content distribution system comprising: at least one user terminal including biometric feature input means; and a content distribution server to which said terminal is connected via a network, wherein said content distribution server including: a registered user information table in which specific personal information, a user identification, and biometric feature information regarding a user are registered by making a connection therebetween, said personal information, user identification, and biometric feature information being inputted from said user terminal; first comparing means for reading, according to a user identification of a person who requests a content distribution inputted from said user terminal, first biometric feature information of said person from said registered user information table, for requesting said person to input second biometric feature information, and for performing a comparison between said second biometric feature information inputted from said user terminal in response to said input request and said first biometric feature information read from said table; and content distribution means for distributing a required content to said user terminal only when match is made as a result of said comparison.

In accordance with one aspect of the present invention, there is provided a content distribution system comprising: at least one user terminal including biometric feature input means; and a content distribution server to which said terminal is connected via a network, wherein said user terminal including: biometric feature storage means for storing first biometric feature information of a registered user inputted from said biometric feature input means; content accumulation/reproduction means for accumulating and reproducing a content distributed from said content distribution means; and comparing means for performing a comparison between second biometric feature information of a person who requests a content reproduction inputted from said biometric feature input means and said first biometric feature information stored in said biometric feature storage means, and for allowing said content accumulation/reproduction means to reproduce the distributed content only when match is made as a result of said comparison.

In accordance with one aspect of the present invention, there is provided a content distribution system comprising: a content distribution server; a shared service terminal connected via a network to said content distribution server; and a portable user terminal including biometric feature input means connectable to said shared service terminal; wherein said portable user terminal performs a predetermined encryption processing on user's biometric feature information associated with said biometric feature inputted from said biometric feature input means and transmits said encrypted biometric feature information to said content distribution server via said shared service terminal, and wherein said content distribution server performs a predetermined decryption processing on said encrypted biometric feature information received from said portable user terminal via said shared service terminal, performs a comparison between said encrypted biometric feature information and biometric feature information of a registered user which has previously been registered, and distributs a content to said shared service terminal only when match is made as a result of said comparison.

In accordance with one aspect of the present invention, content distribution system comprising: at least one user terminal including biometric feature input means; and a content distribution server to which said terminal is connected via a network, wherein said content distribution server includes: a registered user information table in which a user identification to identify a user and user's biometric feature information are registered by making a connection therebetween, said user identification and biometric feature information being inputted from said user terminal; a terminal personalization setup data table in which terminal setup data to personalize said user terminal and said user identification are registered by making a connection therebetween; comparing means for obtaining a user identification of a person who requests a content distribution from said registered user information table according to biometric feature information of said person inputted from said user terminal, and for reading, according to said user identification, terminal setup data regarding said person from said terminal personalization setup data table; and terminal personalization designating means for transmitting said terminal setup data read from said terminal personalization setup data table to said user terminal, and wherein said user terminal includes: terminal personalization setup means for personalizing said user terminal according to said terminal setup data received from said terminal personalization designating means.

In accordance with one aspect of the present invention, there in provided a content distribution system comprising: at least one user terminal including biometric feature input means; and a content distribution server to which said terminal is connected via a network, wherein said content distribution server includes: a terminal personalization setup data table in which a user identification to identify a user, biometric feature information of a user, a biometric feature identification to identify said biometric feature information, and terminal setup data to personalize a user terminal are registered by making a connection therebetween, said user identification, biometric feature information, biometric feature identification, and terminal setup data being inputted from said user terminal; comparing means for obtaining a user identification and biometric feature information of a person who requests a content distribution from said terminal personalization setup data table according to biometric feature information of said person inputted from said user terminal, and for reading, according to said user identification and biometric feature identification, terminal setup data regarding said person from said terminal personalization setup data table; and terminal personalization designating means for transmitting said terminal setup data read from said terminal personalization setup data table to said user terminal, and wherein said user terminal includes: terminal personalization setup means for personalizing said user terminal according to said terminal setup data received from said terminal personalization designation means.

In accordance with one aspect of the present invention, there is provided a content distribution server to which at least one user terminal is connected via a network, comprising: a registered user information table in which specific personal information, a user identification, and biometric feature information regarding a user are registered by making a connection therebetween, said personal information, user identification, and biometric feature information being inputted from said user terminal; comparing means for reading, according to a user identification of a person who requests a content distribution inputted from said user terminal, first biometric feature information of said person from said registered user information table, for requesting said person to input second biometric feature information, and for performing a comparison between said second biometric feature information inputted from said user terminal in response to said input request and said first biometric feature information read from said table; and content distribution means for distributing a required content to said user terminal only when match is made as a result of said comparison.

In accordance with one aspect of the present invention, there is provided a content distribution server to which at least one user terminal is connected via a network, comprising: a registered user information table in which a user identification to identify a user and user's biometric feature information are registered by making a connection therebetween, said user identification and biometric feature information being inputted from said user terminal; a terminal personalization setup data table in which terminal setup data to personalize said user terminal and said user identification are registered by making a connection therebetween; comparing means for obtaining a user identification of a person who requests a content distribution from said registered user information table according to biometric feature information of said person inputted from said user terminal, and for reading, according to said user identification, terminal setup data regarding said person from said terminal personalization setup data table; and terminal personalization designating means for transmitting said terminal setup data read from said terminal personalization setup data table to said user terminal.

In accordance with one aspect of the present invention, there is provided a content distribution server to which at least one user terminal is connected, comprising: a terminal personalization setup data table in which a user identification to identify a user, biometric feature information of a user, a biometric feature identification to identify said biometric feature information, and terminal setup data to personalize a user terminal are registered by making a connection therebetween, said user identification, biometric feature information, biometric feature identification, and terminal setup data being inputted from said user terminal; comparing means for obtaining a user identification and biometric feature information of a person who requests a content distribution from said terminal personalization setup data table according to biometric feature information of said person inputted from said user terminal, and for reading, according to said user identification and biometric feature identification, terminal setup data regarding said person from said terminal personalization setup data table; and terminal personalization designating means for transmitting said terminal setup data read from said terminal personalization setup data table to said user terminal.

In accordance with one aspect of the present invention, there is provided a user terminal including biometric feature input means connected via a network to a content distribution server, comprising: fingerprint-feature storage means for, at the time of registration to said content distribution server, storing user's biometric feature information inputted from said biometric feature input means; content accumulation/reproduction means for accumulating and reproducing a content distributed from said content distribution server; and comparing means for performing a comparison between biometric feature information of a person who requests a content reproduction which has been inputted from said biometric feature input means and said user's biometric feature information stored in said biometric feature storage means, and for allowing said content accumulation/reproduction means to reproduce the distributed content only when match is made as a result of said comparison.

BRIEF DESCRIPTION OF THE DRAWINGS

The objects and features of the present invention will become more apparent from the consideration of the following detailed description taken in conjunction with the accompanying drawings in which:

FIG. 7 is a block diagram showing one example of a system including a recording medium having recorded a procedure of content distribution using inputted biometrics features.

DESCRIPTION OF THE EMBODIMENTS

Referring to the accompanying drawings, description will be given of preferred embodiments of the present invention.

First Embodiment

Figure 1:
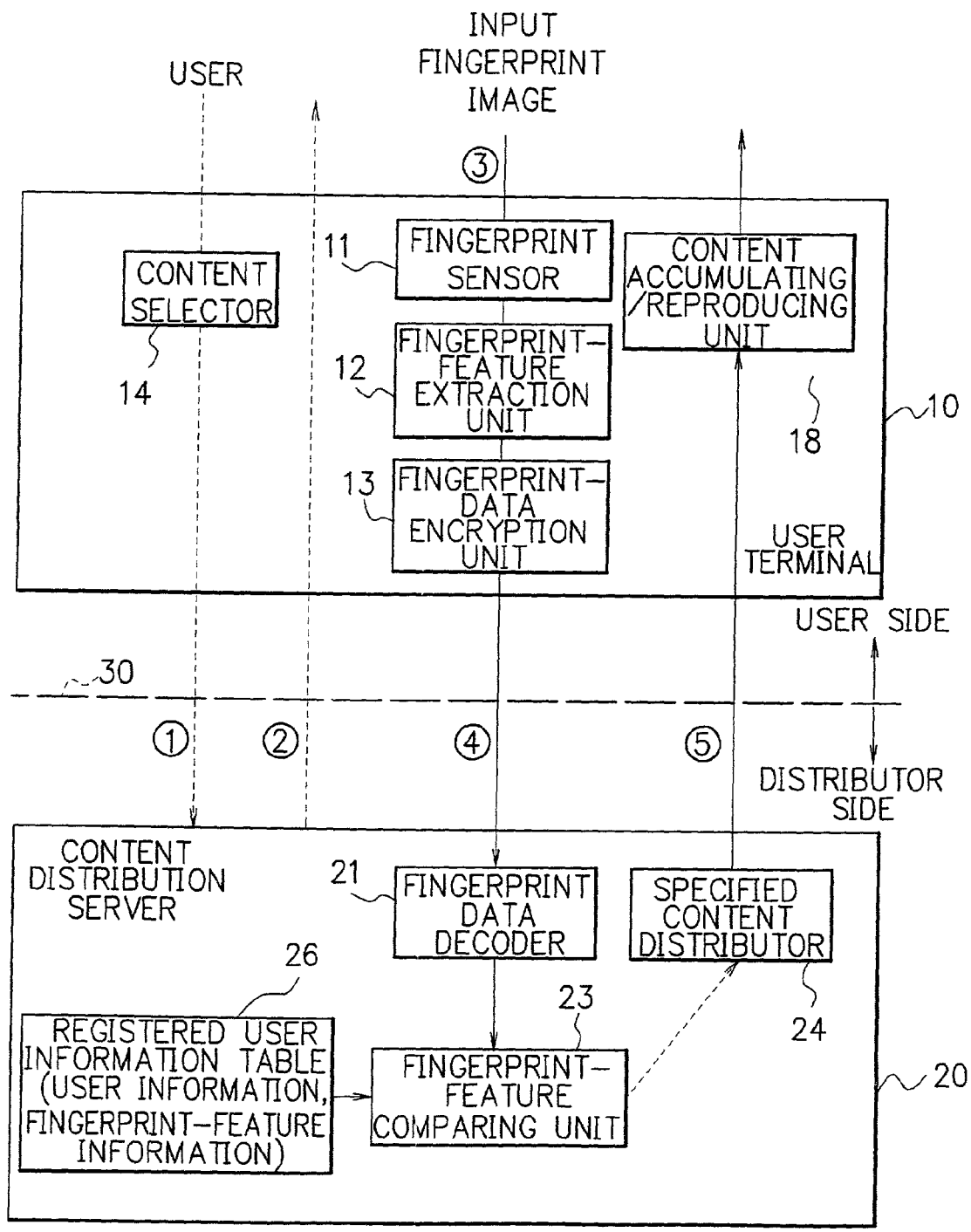
FIG. 1 is a schematic block diagram showing constitution of a content distribution system according to a first embodiment of the present invention.

FIG. 1 is a block diagram schematically showing a configuration of a content distribution system according to a first embodiment of the present invention. In the system of FIG. 1, a user receives a content from a content distributor or provider by a terminal owned in his or her house. The system includes a user terminal 10, a content distribution server 20, and a network 30 to establish connection between the terminal 10 and the server 20. The network 30 includes, for example, the Internet, and a wired or wireless telephone network.

The user terminal 10 is so-called digital electric appliances and/or information electric appliances for family use having an information processing function and a communication function, such as a personal computer (PC), a video game machine, an information terminal, an ordinary wired telephone, a portable telephone, and a communication terminal. The user terminal 10 primarily includes a fingerprint sensor 11, a fingerprint-feature extraction unit 12, a fingerprint-data encryption unit 13, a content selection unit 14, and a content accumulating/reproducing unit 18.

When a user touches a sensing part of the fingerprint sensor 11 with his or her finger, the sensor 11 reads an image of the fingerprint. The image of fingerprint produced by the sensor 11 is converted into digital data to be fed to the fingerprint-feature extraction unit 12. The extraction unit 12 extracts features of the fingerprint from the user's fingerprint image to produce fingerprint data. The data is used for a comparison or verification of fingerprints.

The fingerprint-data encryption unit 13 performs a predetermined encryption processing for the fingerprint data obtained by the extraction unit 12. For the encryption processing in the encryption unit 13, a method of generating an encryption key may be previously determined by agreement between the encryption unit 13 and a fingerprint-data decrypting part which will be described later, of the content distribution server 20. The encryption is accomplished using the encryption key. For this purpose, a cryptography method using a common-private key system such as a data encryption standard (DES) or a public key encryption algorithm (asymmetric encryption system) such as an RSA (named after its inventors, Rivest, Shamir, and Adleman) may be employed. In the RSA method, a public key associated with a private key for decryption stored in the content distribution server 20 is used for encryption. Fingerprint data so encrypted is sent via the network 30 to the server 20.

When the content selection unit 14 including a display unit (not shown) is connected to the content distribution server 20, the display unit displays a menu regarding contents available for the user. When the user selects from the displayed menu distribution of a desired one of the contents, a content distribution request is sent to the server 20 according to the selection.

The content accumulating/reproducing unit 18 accumulates a content distributed from a specified content distribution part which will be described later, of the content distribution server 20, reproduces the accumulated content, transfers the content, and lets the content display.

The content distribution server 20 distributes the required content to the user terminal 10, in response to the content distribution request from the content selection unit 14 of the user terminal 10. The server 20 primarily includes a fingerprint-data decryption unit 21, a fingerprint-feature comparing unit 23, a specified-content distribution unit 24, and a registered user information table 26.

The decryption unit 21 receives encrypted fingerprint data (a message) from the encryption unit 13 of the user terminal 10, and decrypts the message. The decryption processing corresponds to the encryption system used by the encryption unit 13 of the user terminal 10. For example, if the encryption unit 13 uses a common-private key system as an encryption method, the decryption processing is carried out using the same key as that generated by an encryption-key generation part of the encryption unit 13. If the encryption unit 13 uses a public key encryption algorithm (asymmetric encryption system) as an encryption method, a decryption processing is carried out by utilizing a private key corresponding to a public key used for the encryption.

The registered user information table 26 is a table containing user identifiers and fingerprint-feature information of the registered users accordingly. The fingerprint-feature information registered in the table 26 is used for comparing fingerprints to identify the pertinent user. The fingerprint-feature comparing unit 23 compares decrypted fingerprint features obtained by the decryption unit 21 with user's fingerprint features registered in the table 26. In the fingerprint comparison, fingerprint features of respective users registered in the table may be sequentially read therefrom for the comparison (1-to-N comparison). Alternatively, a user may input his or her a user ID at issuance of a content distribution request, so that associated fingerprint features are read from the registered user information table 26 in accordance with the user ID to thereby achieve a comparison of fingerprints.

The specified-content distribution unit 24 sends digital data associated with a content requested by a user to the user terminal 10 via the network 30. The distribution unit 24 sends the content to the user terminal 10 only when the comparing unit 23 has identified the user.

Actual fingerprint comparison by the fingerprint sensor 11, the fingerprint-feature extraction unit 12, and the fingerprint-feature comparing unit 23, is described in Japanese Patent Publication No. 63-13226 and Japanese Patent Application Laid-Open No. 4-33065 as a fingerprint comparing apparatus. The apparatus according to No. 63-13226 enables to execute a safety and high-accurate comparison of fingerprints, by checking positions X and Y and a direction D in each feature point which characterizes patterns of fingerprint. Local coordinate system uniquely determined by each feature point is divided into a plurality of sectoral areas. By checking flow lines between the feature point and a nearest point in the neighborhood of the sectoral area, that is, a relation therebetween, a comparison is conducted with stable and high precision. Fingerprint comparing apparatus described in Japanese Patent Application Laid-Open No. 4-33065, compares fingerprints inputted thereto and fingerprint of one finger or all fingerprints of a plurality of fingers registered thereto. The apparatus therefore achieves identification with high operability and high reliability even when the ID number is stolen or a user forgets the number.

Description will now be given of a specific procedure to distribute a content in the content distribution system according to the present embodiment.

(1) User Registration

User should install a terminal in a place such as his or her house to handle commercial transactions. The terminal specified by a content distributor includes at least the fingerprint sensor 11, the fingerprint-feature extraction unit 12, and the fingerprint-data encryption unit 13, so that it can use a content distribution service provided by the content distribution server 20. The user then issues a request from the user terminal 10 to the content distribution server 20 to conduct a user registration.

Upon reception of the request, the server 20 sends to the user terminal 10 a message containing procedures for the user registration. The user inputs necessary information from the user terminal 10 with reference to user registration procedures contained in the message. Specifically, the user inputs from the user terminal 10 user information including personal information such an identifier (a user ID), a user address, and a user name, and settlement information designating a settlement method such as the use of a credit card or a direct debit. At the same time, the user inputs his or her fingerprint using the fingerprint sensor 11. The fingerprint-feature extraction unit 12 processes the fingerprint image produced by the sensor 11 to obtain features used for a comparison. The fingerprint-data encryption unit 13 then encrypts the fingerprint features.

When the content distribution server 20 receives from the user terminal 10 the user information and encrypted fingerprint data necessary for a user registration, the fingerprint-data decryption unit 21 decrypts the encrypted fingerprint data. Fingerprint-feature information obtained by the decryption and a user ID of the user information are correlated with each other, and registered in the registered user information table 26. As mentioned above, data encrypted by the fingerprint-data encryption unit 13 can be correctly decrypted in the decryption unit 21 using a decryption key that has been previously agreed upon. With a correct decryption, it is therefore possible to confirm that a fingerprint processing part of the user terminal 10 is accurately operating.

(2) Content distribution

Next, description will be given of procedures when a user actually receives a content distributed from the content distributor.

In the case where a user desires to acquire a content associated with a piece of music, the user operates the user terminal 10 connected to the network 30. The user then has access to the content distribution server 20 using a tool such as a worldwide web (WWW) browser. After that, the user inputs his or her user ID and selects by the content selection unit 14 a desired one of the contents from among a plurality of alternatives. With this operation, a request for distribution of the selected content is sent to the content distribution server 20 (① in FIG. 1).

Upon reception of the content distribution request from the user terminal 10, the server 20 sends a request for inputting a fingerprint to the user terminal 10 so as to confirm whether or not a person who has requested a content is a registered user (② of FIG. 1). In response to the request, the user inputs his or her fingerprint as an image from the fingerprint sensor 11 of the terminal 10 in accordance with a predetermined procedure (③ of FIG. 3). The fingerprint-feature extraction unit 12 then extracts fingerprint features from the image of inputted fingerprint which are used for a comparison. The fingerprint-data encryption unit 13 encrypts data associated with the fingerprint features using an encryption key that has previously been agreed upon. The encrypted fingerprint data is then sent to the content distribution server 20 (④ of FIG. 1).

In the server 20, when the encrypted fingerprint data is received from the user terminal 10, the fingerprint-data decryption unit 21 decrypts that data. The fingerprint-feature comparing unit 23 then reads pertinent fingerprint-feature information from the registered user information table 26 according to the user ID received when the content distribution has been requested. The comparing unit 23 compares the obtained information with the fingerprint-feature information decrypted by the decryption unit 21. As a result of the comparison, if these fingerprint features sufficiently match with each other and are regarded as identical, the specified-content distribution unit 24 assumes that the user has been correctly identified, thus distributing the requested content to the user terminal 10 (⑤ of FIG. 1).

Distributed contents are subjected to a processing such as accumulation and reproduction (including a transfer or a copying of content) in the content accumulating/reproducing unit 18 of the user terminal 10, so that the user can use the content. For example, when the content includes music, the content is reproduced as music and the user can directly listen to the music by the user terminal 10 or the content is transferred to a portable music player (a minidisk player) to be copied on a minidisk. In a case where the content includes a software game, the software is executed and the user enjoys the game by the user terminal 10. When the content includes information such as new items, this information is displayed on the user terminal 10 or on another portable display, not shown.

As for a price of the content distribution service, the settlement is conducted according to a settlement method determined in advance by the user and the content distributor when a user registration has been taken place. Confirmation is conducted through a comparison of the fingerprints whether or not a user at the time of registration is the same person who has requested a distribution.

According to the above-mentioned embodiment, the user information inputted at the time of user registration and the user ID supplied when a content distribution is requested are sent to the content distribution server 20 as is, that is, they are sent with no encryption. It is desirable however to encrypt the user information before transmission to get a higher security. In this situation, a device to encrypt information data and a device to decrypt the encrypted information data are required.

Second Embodiment

In the first embodiment, a function to restrict a use of a content distribution service is assigned to the content distribution side. However, it is possible, by adding a function to restrict a use of the service to the user side, to prevent surely a fraudulent use of the content distribution service. For example, according to an agreement between a content distributor and a user, various kinds of limitations may be imposed for the prevention of an illegal copying of contents. The limitations include that only a specified terminal can use a content, the content cannot be copied onto another device or medium, and the content can be used only a specified number of times. Restriction of use can be easily implemented by conducting appropriate encryption of a content at the time of its distribution and by restricting at the user terminal side decryption of data associated with a distributed content. The restriction at the user terminal side can be achieved by identifying a user who requires a use of distributed contents. Description will be given of an example in which authentication is conducted for a user who actually uses a content, by using a fingerprint sensor installed in a user terminal.

Figure 2:
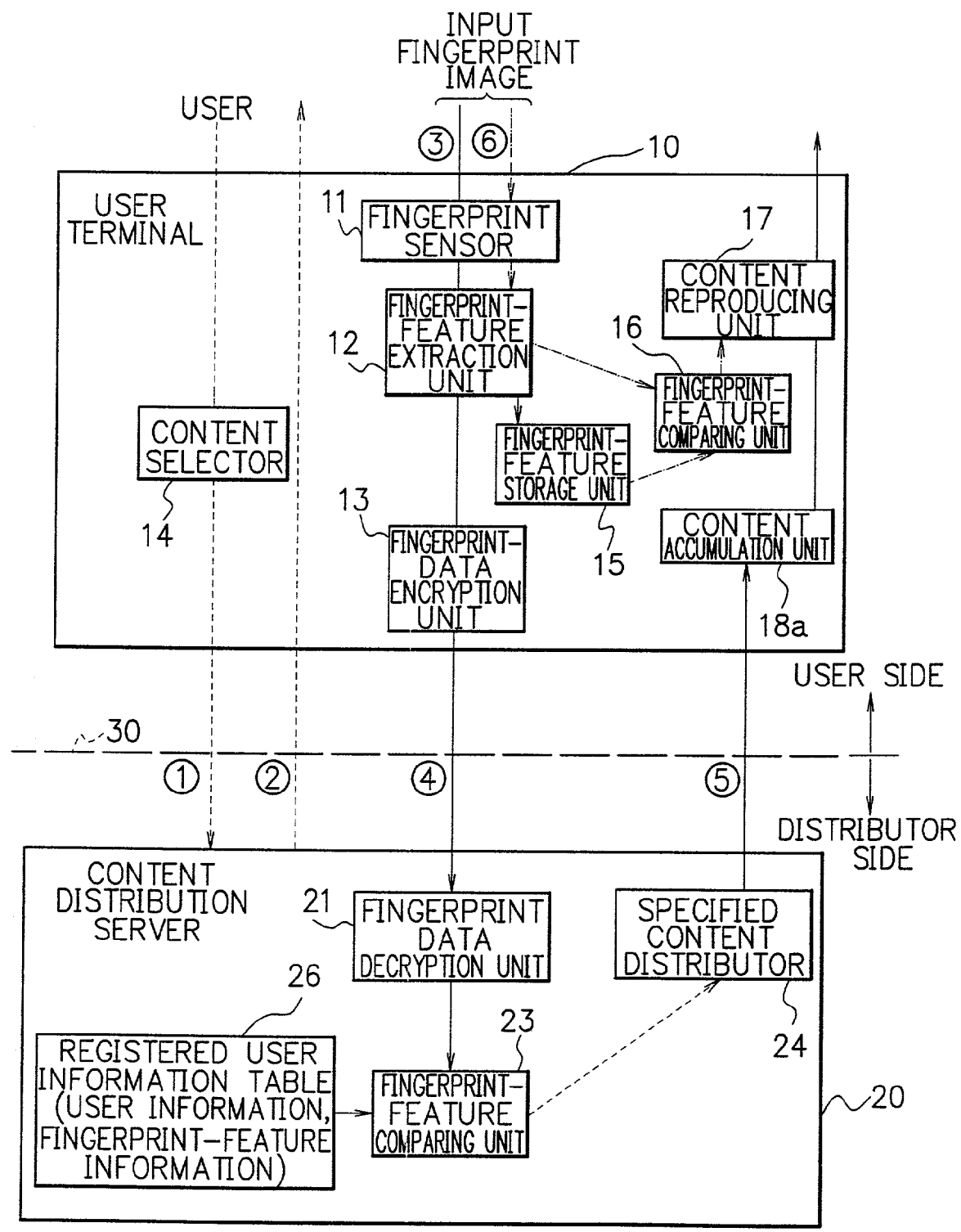
FIG. 2 is a block diagram schematically showing constitution of a content distribution system according to a second embodiment of the present invention.

FIG. 2 is a block diagram schematically illustrating construction of a content distribution system according to a second embodiment of the present invention. Distribution system according to a second embodiment is almost the same in construction as that of the first embodiment shown in FIG. 1, excepting that for a user who requires a use of content by the user terminal 10, identification of the user is accomplished by a fingerprint comparison. In FIG. 2, the same references are used as in FIG. 1 to denote similar parts and detailed description of these parts are omitted.

In the second embodiment, the user terminal 10 includes a fingerprint-feature storage unit 15 and a fingerprint-feature comparing unit 16 to perform identification of a user by a fingerprint comparison at the time of using a content. In place of the content accumulating/reproducing unit 18, a content reproducing unit 17 and a content accumulation unit 18a are equipped in the terminal 10.

The fingerprint-feature storage unit 15 stores fingerprint features of a person who requires a content distribution which are extracted by the fingerprint-feature extraction unit 12 when the content distribution is requested. These fingerprint features are also sent to the fingerprint-data encryption unit 13. The fingerprint-feature comparing unit 16 compares fingerprint features of a person who requires a use of content that are extracted by the extraction unit 12 at the time he or she uses a distributed content, with the fingerprint features of a person who requires the distribution that are stored in the storage unit 15. The comparing unit 16 allows the content reproducing unit 17 to reproduce the content accumulated in the content accumulation unit 18a, only when these fingerprint features match with each other.

Description will be given in detail of a content distributing and reproducing procedure conducted in the content distribution system. It should be noted that a user registration procedure of the second embodiment is the same as that of the first embodiment, therefore a description thereof will be omitted here. Furthermore, in the second embodiment, a content distribution request (① of FIG. 2), a fingerprint input request (② of FIG. 2), a fingerprint input (③ of FIG. 2), an encrypted fingerprint data transmission (④ of FIG. 2), and a content distribution (⑤ of FIG. 2) are the same as those described in the first embodiment (① to ⑤ of FIG. 1), detailed description thereof will be also omitted.

In response to a fingerprint input request from the content distribution server 20 (② of FIG. 2), if the user, i.e., a person who requires a content distribution inputs an image of his or her fingerprint from the fingerprint sensor 11 of the terminal 10 in accordance with a predetermined procedure (③ of FIG. 2), the fingerprint-feature extraction unit 12 extracts from the fingerprint image fingerprint features used for a comparison. The extracted fingerprint features are sent to the fingerprint-data encryption unit 13 to be encrypted. The features are also sent to the fingerprint-feature storage unit 15 for their storage. The encrypting unit 13 encrypts the data in the same way as that described in the first embodiment.

The content distribution server 20, when the encrypted fingerprint data of a person who has required the distribution is sent from the encryption unit 13, decrypts the encrypted fingerprint data in the same way as that conducted in the first embodiment, so that identification of said person is performed. If the identification is successfully performed, the specified-content distribution unit 24 distributes the required content to the user terminal 10 (⑤ of FIG. 2). The content so distributed from the distribution unit 24 has already been subjected to a necessary encryption. Therefore, the content cannot be reproduced or copied by a method other than that is appropriate.

The content distributed from the specified-content distribution unit 24 is accumulated in the content accumulation unit 18*a* of the user terminal 10. Upon reception of the content, the terminal 10 notifies the user of the condition in an appropriate way. When the user (who has requested a use of content) desires to use the distributed content, he or she is required again to input his or her fingerprint. Use of a content includes operations such as an execution, reproduction, copying, and display of music, a game/application software, and news items, as described in the first embodiment.

When the user inputs from the user terminal 10 items necessary to use the distributed content, the terminal 10 requires the user to input a fingerprint for the purpose of confirming whether or not he or she is a person who has requested the content distribution. In response to the request for inputting a fingerprint, the user inputs his or her fingerprint from the fingerprint sensor 11 of the terminal 10 in accordance with a predetermined procedure (⑥ of FIG. 2).

When a fingerprint is inputted as an image, the fingerprint-feature extraction unit 12 extracts from the image fingerprint features used for a comparison. The extracted fingerprint features are fed to the fingerprint-feature comparing unit 16. The comparing unit 16 compares these fingerprint features extracted by the extraction unit 12 with fingerprint features stored in the fingerprint-feature storage unit 15. The comparing unit 16 allows the content reproducing unit 17 to reproduce a content stored in the content accumulation unit 18*a*, only when these features match with each other. This results in the condition where a content stored in the accumulation unit 18*a* is decrypted into a format available for the user.

By employing the content distribution system according to the present embodiment, it is possible for the user to receive distribution of music and an application software by a personal computer connected to the network, and distribution of a software game by an electronic video game machine connected to the network. Moreover, a mobile telephone, e.g., a portable telephone connected in a wireless manner can be used as a terminal to receive music distributed from, for example, a server. A television set connected by a cable can be also used as a terminal to receive distribution of TV programs and movie videos. Additionally, digital electric appliances with dedicated functions can be adopted as a terminal to receive news items and the like.

According to the content distribution system of the present embodiment, a user authentication is carried out when the user requires a use of a distributed content. This leads to a secondary effect that even when user's family members share a single user terminal, the user can avoid a situation where his or her own content is used by other family members or other family members steal a glance at the content. More specifically, restrictions can be imposed for each user to prevent children from watching contents intended for adults.

Third Embodiment

In the content distribution system according to the second embodiment, a user authentication is achieved twice, that is, the user is authenticated when he or she receives a content and when he or she requires a use of the distributed content. However, a fraudulent use of the reproduced content can be prevented by carrying out the user authentication only when the user requires a use of the content. For example, if the content accumulation unit 18*a* of the user terminal 10 as shown in the system of FIG. 2 has a sufficient confidentiality, it is possible that the content distribution server 20 delivers at random a large amount of content data to the user terminal 10, and the terminal 10 then shows the user titles and summary of respective contents. Identification of user is therefore carried out when he or she selects and uses an interesting one of the contents. Description will now be given of an example of such a system.

Figure 3:
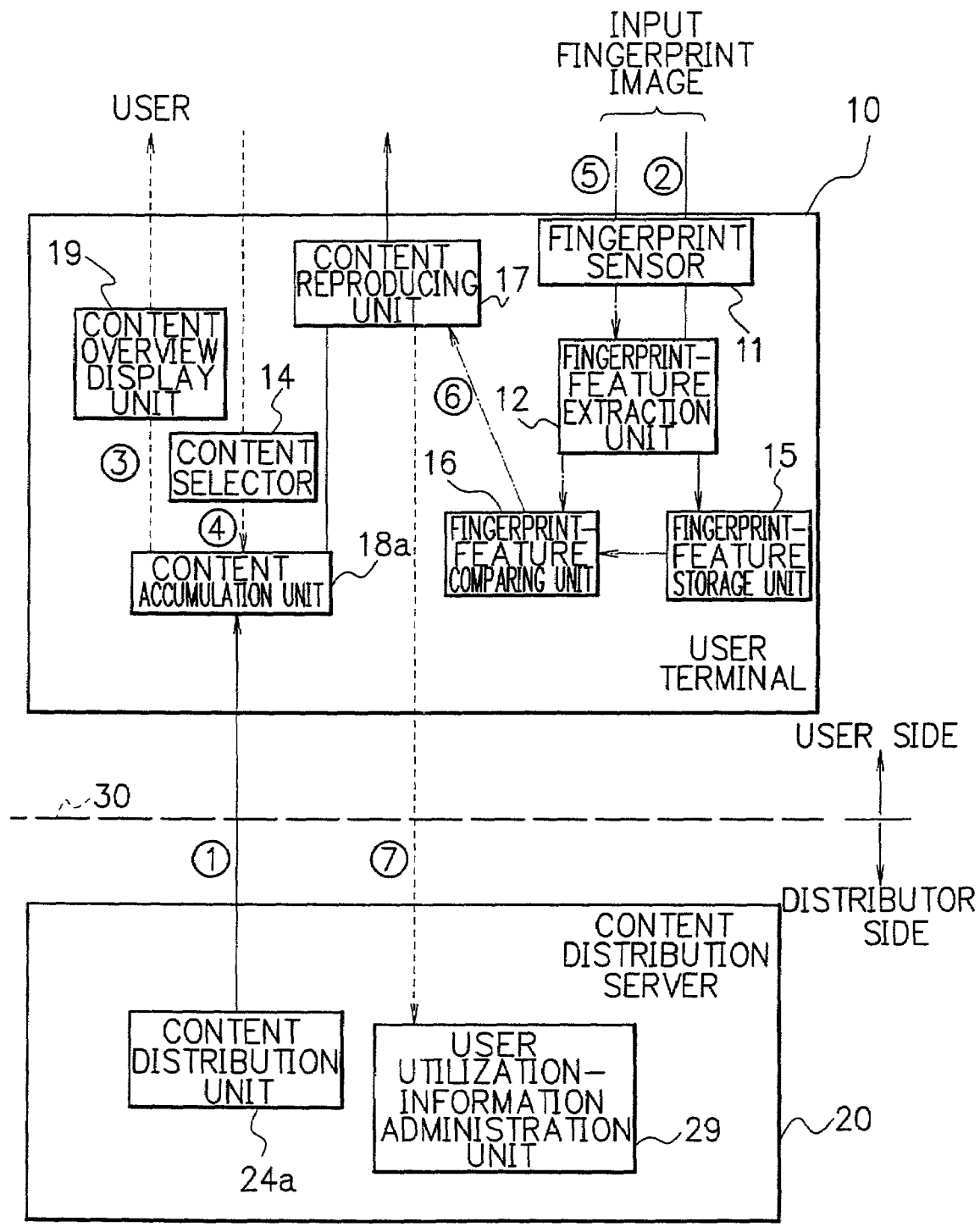
FIG. 3 is an illustrative block diagram showing constitution of a content distribution system according to a third embodiment of the present invention.

FIG. 3 is a block diagram schematically showing construction a content distribution system according to a third embodiment of the present invention. The user terminal 10 of the system primarily includes a fingerprint sensor 11, a fingerprint-feature extraction unit 12, a content selection unit 14, a fingerprint-feature storage unit 15, a fingerprint-feature comparing unit 16, a content reproducing unit 17, a content accumulation unit 18*a*, a content overview display 19. The content distribution server 20 primarily includes a content distribution unit 24*a* and a user utilization-information administration unit 29. In FIG. 3, the same references are used as in FIG. 2 to denote similar parts and detailed description of these parts are omitted.

A large amount of content data is previously distributed at random from the content distribution unit 24*a* of the server 20 to the content accumulation unit 18*a* of the user terminal 10, as indicated by (① of FIG. 3. The data is therefore stored in the accumulation unit 18*a*. Content data distributed from the distribution unit 24*a* is appropriately subjected to an encryption processing in advance. The content can be reproduced or copied only by a specified or allowable method.

By accessing the content distribution server 20 from the user terminal 10, a user performs a user registration in accordance with a predetermined procedure. The terminal 10 requires the user to input his or her fingerprint at the time of the user registration. The user in response to the requirement inputs his or her fingerprint from the fingerprint sensor 11 in accordance with a predetermined procedure (② of FIG. 3). When the fingerprint is inputted as an image, the fingerprint-feature extraction unit 12 extracts from the image fingerprint features used for a comparison. The fingerprint features are then stored in the fingerprint-feature storage unit 15.

When the user performs prescribed input operations necessary for reproducing the distributed content using the user terminal 10 after the user registration, the terminal 10 displays on the content overview display 19 the title of the content, overviews of the content, extracted parts of the content which attract interest, a short attached content for promotion (③ of FIG. 3). The user then chooses a desired content by the content selection unit 14 (④ of FIG. 3). Use of content indicates operations such as an execution, reproduction, copying, and display of music, a software game, an application software, and news items as described above.

When the user selects a desired content from the content selection unit 14 (a request for use), the terminal 10 requires the user to input a fingerprint for confirming whether or not he or she is a registered user. In response to the request for inputting a fingerprint, the user inputs his or her fingerprint from the fingerprint sensor 11 of the terminal 10 in accordance with a predetermined procedure (⑤ of FIG. 3).

When the user inputs his or her fingerprint as an image from the sensor 11, the fingerprint-feature extraction unit 12 extracts fingerprint features from the image. The extracted fingerprint features are fed to the fingerprint-feature comparing unit 16. The comparing unit 16 compares these fingerprint features sent from the extraction unit 12 with fingerprint features stored in the fingerprint-feature storage unit 15 so as to confirm whether the user who has requested the use of content is a registered user. In a case where the comparison result indicates that the use is a registered user, the fingerprint-feature comparing unit 16 allows the content reproducing unit 17 to reproduce the content (⑥ of FIG. 3).

Upon reception of admission of a content reproduction from the comparing unit 16, the reproducing unit 17 fetches out the content requested by the user from the content accumulation unit 18 and decrypts the content into a reproducible form. If the user reproduces the decrypted content, the content reproducing unit 17 sends via the network 30 to the content distribution server 20 information (utilization information) indicating a relationship between the user and the content reproduced by the user (⑦ of FIG. 3). The utilization information sent is accumulated as an actual utilization data in the user utilization-information administration unit 29. The utilization information is used for an accounting operation related to a use of content. The actual utilization data can be used to analyze preference data of each user. It is possible to change in accordance with the analysis result the contents and priority of a content distribution to the user terminal 10 (① of FIG. 3). It is also possible to control the contents and sequence of displayed overviews (③ of FIG. 3) on the content overview display 19 of the user terminal 10.

In the above description, music and software as a typical content are distributed via a network. However, the constitution of the present embodiment is also applicable to a distribution of video contents such as television programs and films via a cable television system. In such a case, it is possible that a content distributor sends a large amount of video contents including television programs and films to a user terminal, say a television set having a content accumulation function, at a night or while the user is absent from home. Accordingly, the user after coming back home, can select and enjoy some of the distributed contents and pay for the contents seen by the user to the distributor.

Fourth Embodiment

In the content distribution system of each embodiment as described above, the user terminal may be a common or shared terminal installed in a store, for example, a convenience store. In this situation, a user who requires a content distribution inputs his or her fingerprint as an image from the shared terminal. However, some users hesitate to put his or her finger on a fingerprint sensor of the shared terminal shared by many people. If such shared terminal is not under the control of users, some are concerned that data of their fingerprints may possibly be stolen by, for example, a manager of the shared terminal. Such anxiety of the user discourages broad use of a content distribution system capable of performing a user identification by using a fingerprint. In view of such context, description will now be given of a content distribution system with excellent safety, by which the user can reproduce a desired content without putting his or her fingers onto a fingerprint sensor of the shared terminal and there is no possibility that the fingerprint data is stolen.

Figure 4:
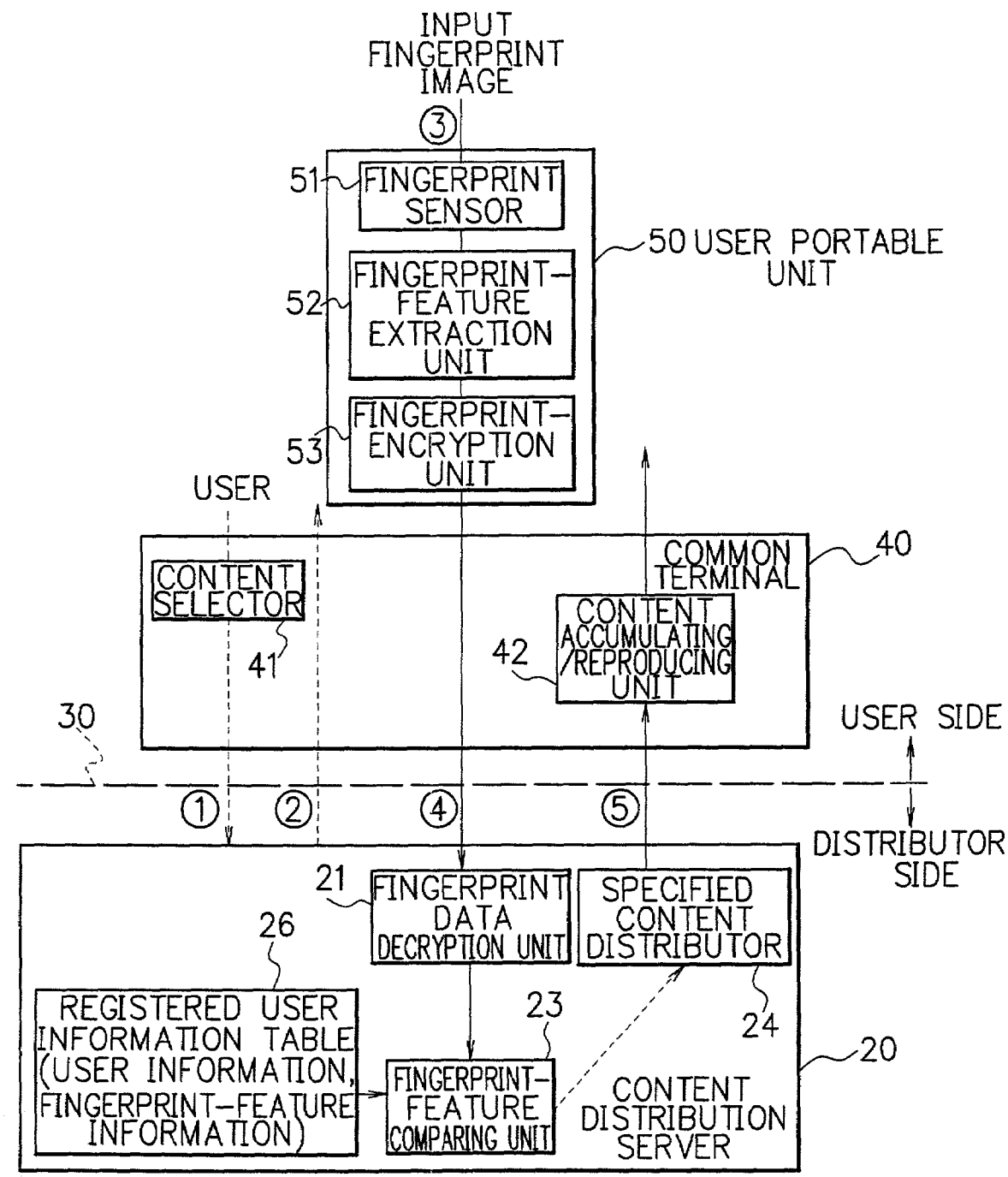
FIG. 4 is a block diagram illustratively showing constitution of a content distribution system according to a fourth embodiment of the present invention.

FIG. 4 shows a schematic block diagram relating to a structure of a content distribution system according to a fourth embodiment of the present invention. The system includes a content distribution server 20, a shared terminal 40 connected via a network 30 to the server 20, and a user's portable unit or a user's portable unit 50 capable of being connected to the shared terminal 40. The server 20 is similar to the server 20 as shown in FIG. 1.

The shared terminal 40 is a terminal installed, for example, in a convenience store, used by the general public. The terminal includes a content selection unit 41 and a content accumulation/reproduction unit 42. The content selection unit 41 and the content accumulation/reproduction unit 42 are substantially the same as the content selection unit 41 and the content accumulating/reproducing unit 18 as shown in FIG. 1. The shared terminal 40 has functions of providing intermediation of a content distribution for the user's portable unit 50 and information exchange therewith. The terminal 40 may be connected to the user's portable unit 50 in various fashions. For example, the unit 50 is partly inserted and connected to the terminal 40, the unit 50 is coupled via a cable to the terminal 40, or the unit 50 communicates with the terminal 40 through a non-contact communication means such as a radio or an infrared light. The shared terminal 40 serves as a terminal for providing a content distribution service to the user from the content distribution server 20. However, as for identification and authentication of the user, it is performed between the user's portable unit 50 and the server 20. That is, at the time of user identification and authentication, the shared terminal 40 acts as a transparent intermediary of communication data exchanged between the user's portable unit 50 and the server 20.

The user's portable unit 50 includes a fingerprint sensor 51, a fingerprint-feature extraction unit 52, and a fingerprint-data encryption unit 53. The units 51 to 53 are substantially the same as those components 11 to 13 of the user terminal 10 respectively, as shown in FIG. 1. The user's portable unit 51 may be an electronic notebook, a portable information terminal, a portable communication terminal, a mobile telephone such as a portable telephone, a card-type instrument with an information processing function, and the like.

Description will now be given of a procedure for the user to receive a content distribution service from the content distribution system.

(1) User Registration

A user who desires to receive a content distribution service from the content distribution server 20 should obtain the user's portable unit 50 specified by the content distributor, which will be distributed from the content distributor or the user buys a type-approved portable unit. The user then brings the unit to a store where the shared terminal 40 is installed, to which the content distribution server 20 can provide a content distribution service. The user connects the unit 50 to the terminal 40 and performs a user registration procedure to the server 20 in accordance with the following steps.

The user operates the unit 50 connected to the terminal 40 to issue a request of a fingerprint registration to the server 20. Upon reception of the request, the server 20 decides a user ID of a person who has issued the registration request, agrees upon an encryption key with the fingerprint-data encryption unit 53 of the unit 50, and then requires the user to input a fingerprint. In response to the request, if the user inputs his or her fingerprint as an image from the fingerprint sensor 51 equipped in the unit 50, the fingerprint-feature extraction unit 12 then extracts fingerprint features from the image. The fingerprint-data encryption unit 13 encrypts the fingerprint features using the encryption key previously agreed upon. The encrypted fingerprint data is delivered via the shared terminal 40 to the content distribution server 20.

In the server 20, the fingerprint-data decryption unit 21 decrypts the encrypted fingerprint data received from the unit 50 and associates information related to the decrypted fingerprint features with the previously-decided user ID. The resultant data is stored in the registered user information table 26.

As described above, data encrypted by the fingerprint-data encryption unit 53 is appropriately decrypted by the fingerprint-data decryption unit 21 using the encryption key which has been previously agreed upon. Accurate decryption results in confirmation that a fingerprint processing part of the user terminal 10 is appropriately operating.

(2) Content Distribution

Description will be given of a procedure when the user actually receives a content distributed from the content distributor.

To receive a content distribution service, the user connects the user's portable unit 50 to the shared terminal 40 and performs prescribed operations at the content selection unit 41 of the terminal 40 so as to select a desired one of the plural contents. The user also inputs his or her user ID. If the content is selected, the terminal 40 requests the server 20 to distribute the content selected by the user (① of FIG. 4).

Upon reception of the content distribution request, the server 20 agrees upon an encryption key with the unit 50 and then requests the user to input a fingerprint (② of FIG. 4). If there is a fingerprint input request from the server 20, the terminal 40 displays the condition on the display.

In response to the request, if the user inputs his or her fingerprint as an image from the fingerprint sensor 51 of the unit 50 in a predetermined procedure (③ of FIG. 4), the fingerprint-feature extraction unit 12 extracts fingerprint features from the image. The fingerprint-data encryption unit 13 encrypts the fingerprint features based upon the encryption key previously agreed upon. The encrypted fingerprint data is sent via the shared terminal 40 to the content distribution server 20.

In the server 20 having received the fingerprint data encrypted by the fingerprint-data encryption unit 53, the decryption unit 21 decrypts the data using the previously-agreed decryption key. The fingerprint-feature comparing unit 23 reads out pertinent fingerprint-feature information from the registered user information table 26 based upon the user ID inputted by the user at the time of a content distribution request. The comparing unit 23 then compares the read-out fingerprint-feature information with the fingerprint-feature information decrypted by the decryption unit 21. If it is determined that these fingerprint features sufficiently match with each other to be regarded an identical fingerprint, the user is assumed to be appropriately identified. Consequently, the specified-content distribution unit 24 sends the content requested by the user to the user terminal 10 (⑤ of FIG. 4).

The content accumulation/reproduction unit 42 accumulates the distributed contents, and the user therefore can perform a desired reproduction of the distributed contents. For example, if the content includes a music software, the user can copy that software from the terminal 40 to a portable music player (a minidisk player) or the like. If the content includes a software game, the user can copy the software from the terminal 40 to a video game machine or to a recording medium in a similar manner. If the content is information content such as news items, the content is displayed on the display or on another portable display.

Regarding a price for a content distribution, a user pays according to a settlement procedure previously determined between the user and the content distributor at the time of a user registration.

According to the present embodiment, whether or not a user to whom a user registration is performed and a user who has requested a content distribution from the shared terminal are the same person, is accomplished by a comparison of fingerprints of users. In the present embodiment, there is no possibility that the fingerprint data remains in the shared terminal to be leaked out and the data is copied for abusive purposes.

In the above description, unspecified number of people use the same content. However, the system according to the present embodiment is not limited by such embodiment. The system is applicable to a case where the contents are personalized for each user. In this situation, biometric features are inputted from the user's portable unit. User identification is performed based upon these features and after that, the content distribution server distributes an individual content to the user. Contents distributed are accumulated in the content accumulation/reproduction unit and decrypted into a form by which the user can reproduce the contents. The decrypted content is displayed for the user or copied onto a user's portable unit brought with the user.

An electronic mail from person to person and an electronic mail magazine sent from a person to many registered subscribers subscribing to the magazine can also be regarded as a kind of content. For such content, while the user is out, he or she can operate the shared terminal installed in a store to read confidential information such as a mail or a mail magazine intended to the user or to download the information from the shared terminal into his or her own device. The system of the present embodiment can be applied to this configuration.

Fifth Embodiment

As described in conjunction with objects of the present invention, a shared terminal installed in a store has a function to handle a wide variety of contents. If such kind of shared terminal is used as a user terminal to receive a content distributed from a content distributor, a processing required to order the content becomes complicated. Moreover, the terminal makes an input operation quite troublesome for a user. A system described below is capable of solving this problem.

Figure 5:
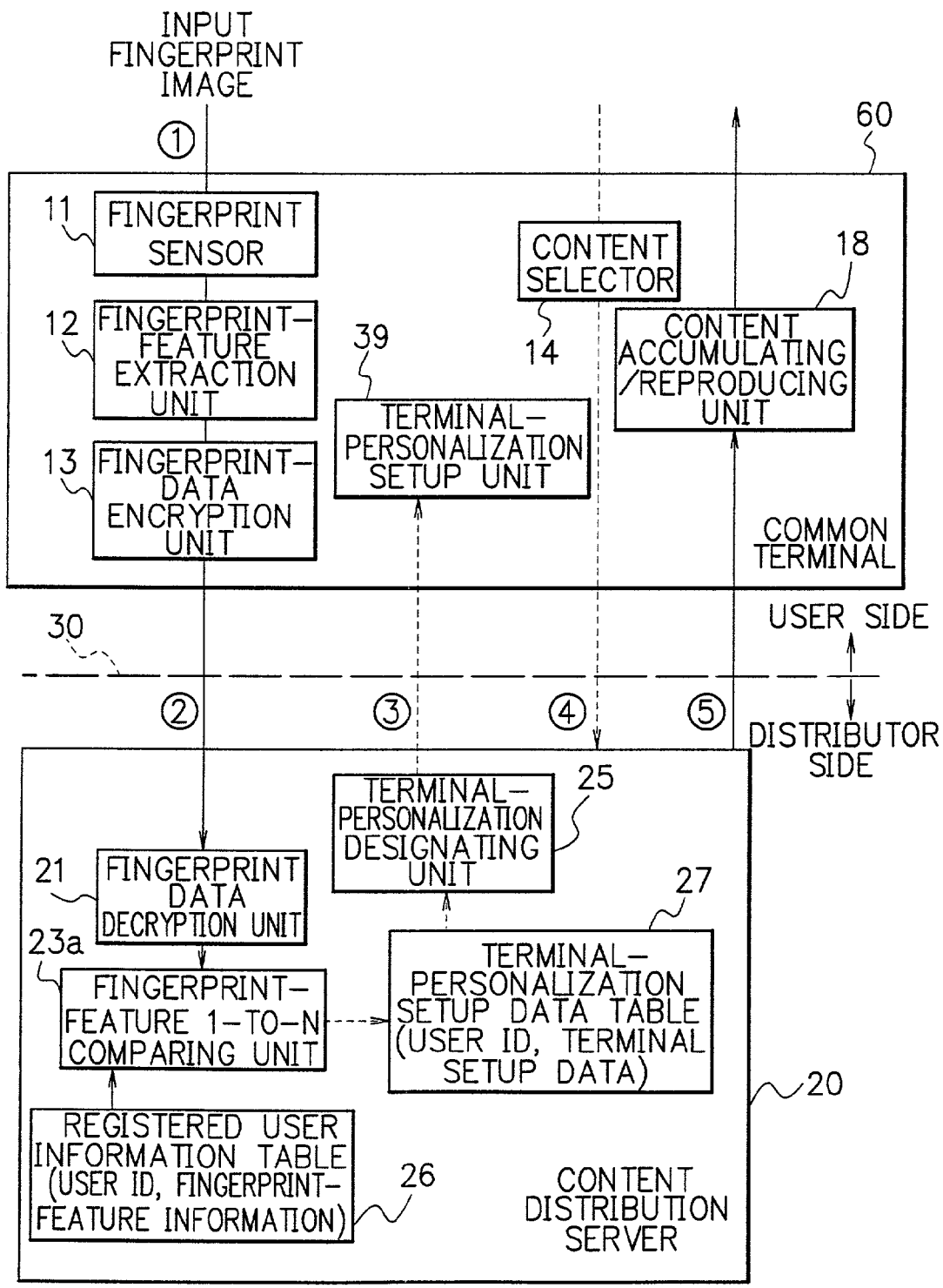
FIG. 5 is a schematic block diagram showing constitution of a content distribution system according to a fifth embodiment of the present invention.

FIG. 5 is a block diagram schematically showing a construction of a content distribution system according to a fifth embodiment of the present invention. This system includes a content distribution server 20, and a shared terminal 60 connected via a network 30 to the server 20.

The content distribution server 20 includes a fingerprint-data decryption unit 21, a fingerprint-feature 1-to-N comparing unit 23a, a terminal personalization designating unit 25, a registered user information table 26, and a terminal personalization setup data table 27. The decryption unit 21, the designating unit 25, and the information table 26 are substantially the same as those described in the fourth embodiment. In the fourth embodiment, the fingerprint-feature comparing unit 23 executes a 1-to-1 comparison where inputted fingerprint data obtained from the decryption unit 21 together with the user ID and fingerprint data read out from the table 26 are checked. In contrast, the fingerprint-feature 1-to-N comparing unit 23a of the fifth embodiment compares inputted fingerprint data attained from the fingerprint-data decryption unit 21 with all fingerprint data registered in the table 26. As a result, the system finds fingerprint data having the highest similarity with the decrypted fingerprint data, namely, only one item of data that exhibits the correspondence, thus outputting a user ID corresponding to the fingerprint data.

The shared terminal 60 is a terminal installed in a store such as a convenience store, and a large number of unspecified persons use the terminal. The terminal 60 includes a fingerprint sensor 11, a fingerprint-feature extraction unit 12, a fingerprint-data encryption unit 13, a content selection unit 14, a content accumulating/reproducing unit 18, and a terminal personalization setup unit 39. The fingerprint sensor 11, the fingerprint-feature extraction unit 12, the fingerprint-data encryption unit 13, the content selection unit 14, and the content accumulating/reproducing unit 18 are substantially the same as those shown in FIG. 1.

Description will now be given of a specific operation of the system according to the fifth embodiment by emphasizing the difference from that of the fourth embodiment.

In the system of the fifth embodiment, a user who is going to receive a content distribution service accesses the content distribution server 20 from the shared terminal 60 so that the user registers his or her fingerprint (a user registration). The user registration is accomplished in almost the same way as in the fourth embodiment, however, the registered user information table 26 keeps fingerprint data associated with all registered users.

To receive a content distribution, the user inputs in stead of a user ID, his or her fingerprint from the fingerprint sensor 11 (① of FIG. 5). At the same time, the user inputs information necessary for the content distribution. The terminal 60 sends the inputted information as user information to the server 20, and executes a user-identification request in place of a user-confirmation request (② of FIG. 5). The fingerprint-feature extraction unit 12 extracts fingerprint features. The encryption unit 13 encrypts data associated with the fingerprint features. Processing steps for the extraction and encryption are the same as those described above.

The fingerprint-data decryption unit 21 of the server 20 decrypts the fingerprint data contained in the user information from the terminal 60. The 1-to-N comparing unit 23a sequentially compares the decrypted fingerprint data obtained from the decryption unit with all fingerprint data registered in the information table 26. The comparing unit 23a finds fingerprint data having the highest similarity with the decrypted fingerprint data, that is, only one item of data exhibiting the correspondence, thus outputting a user ID corresponding to the fingerprint data. According to the user ID resultant from the comparison (a user inquisition), a terminal setup data regarding the user whose user identification has been requested is read from the terminal personalization setup data table 27.

The terminal setup data is a setup data to customize or to personalize the shared terminal 60 operated by the user. By providing the shared terminal 60 with the terminal setup data, it is possible to display a list of user's favorite artists on which new pieces of music are arranged in a leading section for user's easy selection. It is also possible to notify the user of any available software compatible with software which the user has already bought, or of any software corresponding to the same hardware. As for news items and books, a menu is provided in consideration of preference of the user, by giving priority to categories, or in which a display order can be changed. Furthermore, it is possible to memorize routine operations for selection done by the user and to automatically turn a page. Provision of the terminal setup data to the terminal 60 enhances a user friendliness.

The terminal setup data read from the table 27 is sent from the terminal personalization designating unit 25 to the terminal 60 (③ of FIG. 5). In the terminal 60 which has received the data, the terminal personalization setup unit 39 performs a setup processing as described above to display information suitable for the user. Accordingly, a convenient user interface is provided, and the user selects through the use of this interface a desired content by the content selection unit 14.

The selection unit 14 requests the server 20 to distribute the content selected by the user. On receipt of the request, the server 20 sends the required content to the terminal 60. The content accumulation/reproduction unit 18 of the terminal 60 accumulates distributed contents, where a predetermined reproduction processing is performed. For example, if a content is related to music, the content is copied from the terminal 60 onto a portable music player (a minidisk player) owned by the user. If a content includes a software game, it is copied from the terminal 60 onto a user's video game machine or a storage medium. Information such as news items or the like is displayed on the terminal 60, or copied onto another portable display device.

Concerning a price of the content distribution, a settlement method is previously designated at the time of user registration. After the user has reproduced the distributed content, a processing for the payment is performed according to that method.

As described above, in the system according to the fifth embodiment, there is no need for the user to present or input a user ID, which improves user's convenience. Operations for display and a menu selection are individually facilitated for each user, difficulties required for an input and selection operations associated with particular contents are therefore alleviated.

In the system of the fifth embodiment, a user identification using a fingerprint is carried out on the side of the content distribution server 20. The user therefore can enjoy the above-mentioned advantage any time he or she uses any shared terminal that is connected via a network to the content distribution server 20 and is capable of distributing a content. For example, in a case where shared terminals are installed in a franchise convenience store, a user may operate the shared terminal in any one of the convenience stores. In this instance, the shared terminal is personalized for the user only by inputting his or her fingerprint from the fingerprint sensor 11. Accordingly, there is provided a user interface which is easy for the user to use.

Sixth Embodiment

Sixth embodiment according to the present invention is implemented by expanding the fifth embodiment. The sixth embodiment aims at providing a better user interface for a terminal of the user side when the user operates the terminal in his or her house or a shared terminal installed in a store to receive a distributed content, by using a difference in human's inherent biometrics such as a difference in the fingerprint features of each finger.

Figure 6:
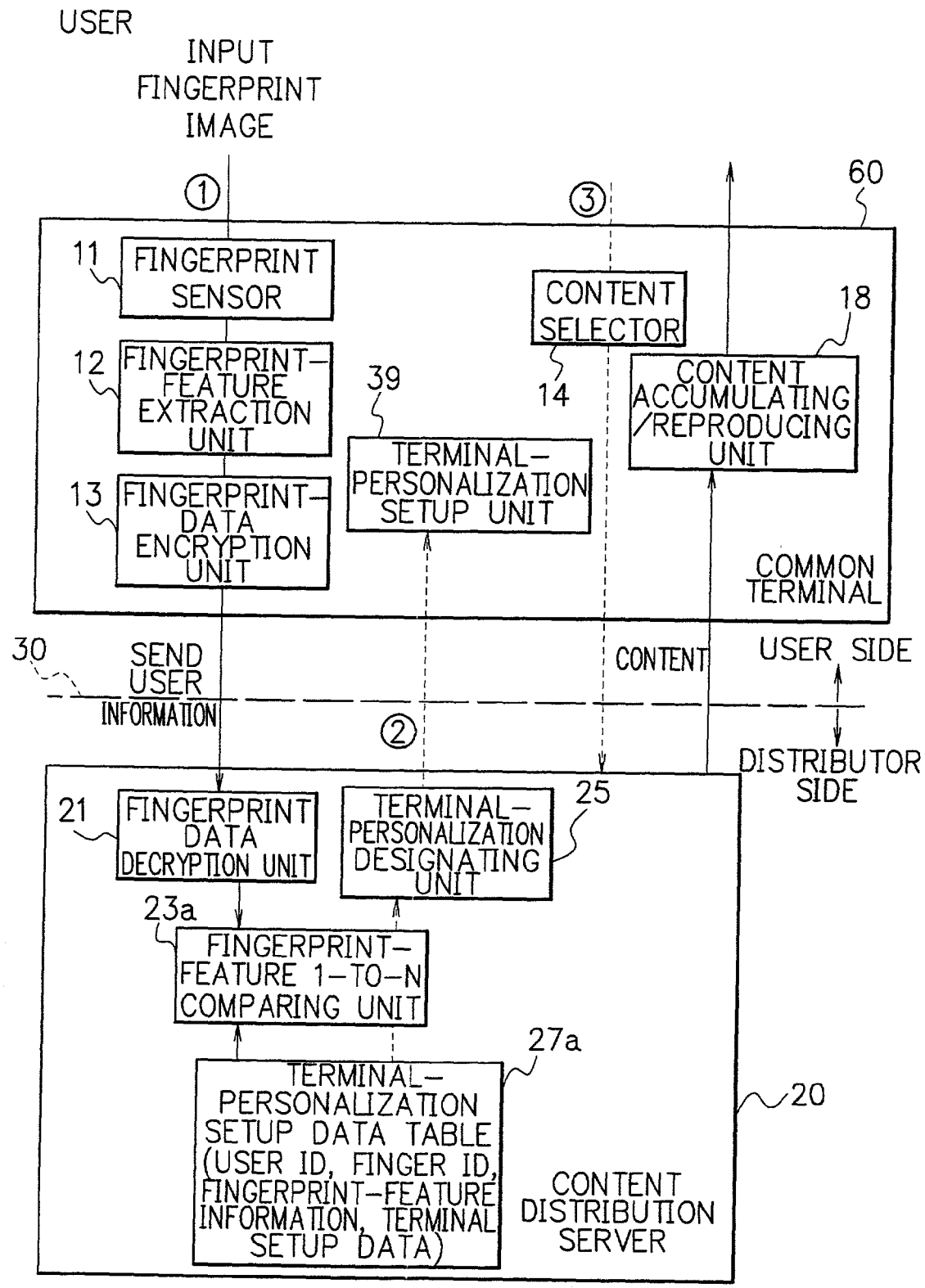
FIG. 6 is a schematic block diagram showing constitution of a content distribution system according to a sixth embodiment of the present invention.

FIG. 6 is a block diagram schematically illustrating a construction of a content distribution system according to the sixth embodiment of the present invention. This system includes a terminal personalization setup data table 27a in a form of a common table made up by combining the terminal personalization setup data table 27 and the registered user information table 26 employed in the fifth embodiment. In FIG. 6, the same reference numerals are used as in FIG. 5 to denote similar parts.

In the sixth embodiment, a user inputs his or her fingerprint from the fingerprint sensor 11 of the shared terminal 60, the content distribution server 20 then identifies the user to resultantly perform a terminal personalization setup suitable for the user. The sixth embodiment differs from the fifth embodiment in that plural kinds of biometric-feature information are used as user's biometric-feature information. Description will now be given of, in comparison with the fifth embodiment, operations and construction of the system according to the sixth embodiment in which fingerprint features associated with user's ten fingers are taken advantage of as biometric-feature information.

Structural difference between the fifth and sixth embodiments resides in that fingerprint-feature information of the user, discriminative information indicating correspondence between a user's pertinent finger and the fingerprint-feature information, a user ID, and terminal setup data are registered in the data table 27a of the server 20. It is noted that the fingerprint-feature information is not necessarily indicative of each finger such as "a right-hand thumb", "a left-hand first finger", or the like. Fingers placed on the fingerprint sensor 11 may be sequentially assigned with respective numbers when the user performs a registration. In the sixth embodiment, the registered user information table and the terminal personalization setup data table are combined to make a common table. However, this table can be separated into distinctive tables as described in the fifth embodiment.

Next, a registration processing will be described. The user initially performs a user registration to the server 20, which is accomplished in the same way as in the fifth embodiment. After this registration, the user carries out a screen registration to establish correspondence between arbitrary fingerprint-feature information (fingerprint-feature information associated with any one of his or her fingers) and an arbitrary selection menu, according to the following procedure.

The user lets the shared terminal 60 display, for example, "a classical music selection menu" for a music content. The terminal 60 is not necessarily the shared terminal used for the user registration. The user then places his or her right-hand first finger on the fingerprint sensor 11 and presses a "screen registration" button. The fingerprint-feature extraction unit 12 extracts fingerprint features from a fingerprint image sent from the sensor 11. The encryption unit 13 encrypts the fingerprint features to produce an encrypted fingerprint data which is sent to the server 20 together with terminal setup information called "a classical music selection menu".

The decryption unit 21 of the server 20 decrypts the encrypted fingerprint data contained in the information received from the terminal 60. The input fingerprint-feature information (associated with a right-hand first finger) obtained by the decryption, a user ID of the user who has performed the screen registration, a finger ID, e.g., "1" for discriminating the input fingerprint-feature information, and the terminal-setup information referred to as "a classical music selection menu" are all registered in the data table 27a with correspondence between them.

The user operates the shared terminal 60 to display "an artist A selection menu" screen which is different from "a classical music selection menu". When the user places his or her left-hand middle finger on the fingerprint sensor 11 and presses the "screen registration" button, the fingerprint-feature extraction unit 12 extracts fingerprint features from a fingerprint image sent from the sensor 11. The encryption unit 13 encrypts the fingerprint features to produce an encrypted fingerprint data which will then be sent to the server 20 together with terminal setup information called "an artist A selection menu".

In the server 20, the decryption unit 21 decrypts the encrypted fingerprint data contained in the information received from the terminal 60. The input fingerprint-feature information (associated with a right-hand middle finger) obtained by the decryption, a user ID of the user who has performed the screen registration, a finger ID, e.g., "2" for discriminating the input fingerprint-feature information, and the terminal-setup information referred to as "an artist A selection menu" are all registered in the data table 27a with correspondence between them.

To actually receive a content after the screen registration, the user places on the fingerprint sensor 11 his or her finger used for the screen registration, without presenting a user ID or without inputting the ID. When the user places, for example, his or her right-hand first finger thereon, an encrypted fingerprint data related to that finger is sent to the content distribution server 20 via the fingerprint-feature extraction unit 12 and the fingerprint-data encryption unit 13.

The decryption unit 21 of the server 20 decrypts the encrypted fingerprint data received from the terminal 60. The fingerprint-feature 1-to-N comparing unit 23a sequentially compares all fingerprint data registered in the data table 27a with the input fingerprint data obtained from the decryption unit 21. As a result of this fingerprint comparison (1-to-N comparison), if the system finds fingerprint data having the highest similarity with the decrypted fingerprint data, namely, only one item of data that exhibits the correspondence, terminal setup information corresponding to the fingerprint data (that is, terminal setup information called "a classical music selection menu") is read from the table 27a. The terminal setup information (a classical music selection menu) thus read out by the comparing unit 23a is sent from the terminal personalization designating unit 25 to the shared terminal 60 (② of FIG. 6).

On receipt of the terminal setup information (a classical music selection menu) from the designating unit 25, the terminal personalization setup unit 19 of the terminal 60, based upon the received information, sets up the terminal so that it displays a classical music selection menu. The terminal 60 resultantly displays the selection menu on it.

When the user selects by the content selection unit 14 a desired content from the selection menu displayed on the terminal 60 (③ of FIG. 6), the selected content is sent in substantially the same manner as in the fifth embodiment, from the server 20 to the terminal 60. The content accumulation/reproduction unit 18 thus accumulates the distributed content to reproduce and process the content.

According to the sixth embodiment, the user can require a content distribution without presenting and inputting his or her user ID. The user can also selectively control a display of, say a display menu, depending on which finger the user uses for the identification. Therefore, user's convenience is improved and difficulties related to an input operation when receiving a content are alleviated.

It should be noted that in the system according to the sixth embodiment, the user can use by simply placing his or her finger on the fingerprint sensor, a shared terminal installed in any one of the stores to receive a content distribution service, without presenting and inputting his or her user ID.

Fingerprint is described by way of example for biometrics in the above embodiments. However, any other biometrics may be used. In this case, a fingerprint sensor, a fingerprint-feature extraction unit, and a fingerprint-feature comparing unit may be replaced with devices, so that a user inputs other kinds of biometric features to be extracted for a feature comparison. Other than fingerprint, biometrics include palm print, face, iris, patterns of retinal blood vessels, palm form, handwriting, and voice print.

Furthermore, the content distribution performed by inputting a biometric feature, i.e., a fingerprint, as described in the above embodiments can be implemented by providing the system with a recording medium on which procedures of the content distribution have been recorded. FIG. 7 is a block diagram of a system configuration including a recording medium on which procedures of the content distribution using biometrics have been recorded.

Recording media 101b and 103b include a magnetic disk, a semiconductor memory, and other type of recording medium. The recording medium 103b stores a program to instruct a server computer 103a of the content distribution server 20 to execute a content distribution processing. In this processing, biometric feature information regarding a person who has requested a content distribution received from a personal computer 101a as a user terminal is compared with biometric feature information associated with registered users previously stored in the server. Content is distributed to the user only when match is made between these pieces of biometric information.

The recording medium 101b stores a program for instructing the personal computer 101a to execute a content reproduction processing which permits reproduction of the content distributed from the content distribution server only when match described below is made. That is, the reproduction is allowed if biometric feature information obtained by measuring biometric features of a person who has requested a content reproduction coincides with biometric feature information obtained by measuring biometric features of a person who has required a content distribution. In this system, a content distribution using biometric features (such as a fingerprint) is carried out by executing by the serve computer 103a the program stored in the recording medium 103b and by executing by the personal computer 101a the program recorded in the recording medium 101b.

The recording media 101b and 103b can also have various kinds of programs for achieving a content distribution as described in the above embodiments. Specifically, the recording medium 101b may store a program to instruct the personal computer 101a as a user terminal to execute processings which include a processing to accumulate contents distributed in advance, a biometric feature comparing processing requiring at the time of reproduction of the accumulated contents, a person who expects a content reproduction to input a biometric feature and performing a comparison between biometric feature information on the biometric feature inputted in response to the request and biometric feature information about registered users which has been previously registered, and a content reproduction processing to allow reproduction of the accumulated contents only when the comparison indicates match of these pieces of biometric feature information.

Furthermore, the recording medium 103b may store a program to instruct the server computer 103a of the content distribution server to execute a registration processing in which a user ID for identifying the user is registered in a registered user information table in correlation with user's biometric feature information and terminal setup data for personalizing a user terminal is registered in a terminal personalization setup data table in correlation with the user ID, and a terminal setup data transmission processing where a user ID of a person who has requested a content distribution is acquired from the registered user information table based on biometric feature information obtained by measuring biometric features of that person, and terminal setup data regarding that person is read according to the user ID from the terminal personalization setup data table so as to transmit the data. The recording medium 101b may store a program to instruct a computer of the user terminal to execute a user terminal personalization processing in which the terminal is personalized according to the terminal setup data received from the content distribution server.

The recording medium 103b may also store a program to instruct the server computer 103a of the content distribution server to execute a registration processing in which a user ID for identifying the user, user's biometric feature information, a biometric feature ID for identifying the biometric feature information, and a terminal setup data for personalizing a user terminal are registered in a terminal personalization setup data table in a correlation manner, and a terminal setup data transmission processing where a user ID together with a biometric feature ID of a person who has requested a content distribution is acquired from the registered user information table based on biometric feature information obtained by measuring biometric features of that person, and terminal setup data regarding that person is read according to the user ID and biometric feature ID, from the terminal personalization setup data table so as to transmit the data. The recording medium 101b may store a program to instruct a computer of the user terminal to execute a user terminal personalization processing where the terminal is personalized according to the terminal setup data received from the content distribution server.

According to the present invention as described above, identification using a biometric feature makes it possible to perform authentification whether a user who has requested distribution of a content from a user terminal is an authentic user having registered a settlement method. With this method, a content can be distributed via a network or the like, without allowing a third person to pass himself off as said person. It is therefore possible to provide a safer content distribution system.

According to the present invention, when the content distributing side desires to restrict a utilization method of a content to be distributed, the content distribution side can authenticate that a user is a person who has requested distribution of a content, without allowing a third person to pass himself off as said person.

Furthermore, the present invention prevents possibility of a leak-out of biometric data at a shared terminal when an electronic commerce is provided from the shared terminal installed in a store. Therefore, it is possible to strengthen security of the overall service system.

In the present invention, a user identification is achieved by inputting a user's biometric feature, and personalization and customization of a user terminal is done according to the inputted biometric feature so that the terminal becomes suitable for the user. This alleviates complexity of a processing required to place an order and improves convenience for the user.

Moreover, the present invention system sets up a user terminal to be suitable for the user, according to differences in man's inherent biometric features, the user can therefore select a desired screen page from among a plurality of menus by following a simple procedure. It is therefore possible to alleviate a complicated ordering processing with respect to a menu selection or the like, and to increase a user's convenience.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A content distribution method comprising:
   measuring a first biometric feature of a person who requests a content distribution;
   performing a first comparison between first information associated with said first biometric feature obtained by the measurement and second information associated with biometric features of registered users which have been previously registered;
   distributing a content when a match is made as a result of said first comparison;
   measuring at the time of reproduction of the content distributed in said content distribution, a second biometric feature of a person who requests a content reproduction;
   performing a second comparison between third information associated with said second biometric feature obtained by the measurement and said first information; and allowing said person who has requested a content reproduction to use said content when a match is made as a result of said second comparison.

2. A content distribution method according to claim 1, wherein said content distributed to a user terminal includes at least one of music data, software for a video game, application software, and news items.

3. A content distribution method according to claim 1, wherein a fingerprint is used as said biometric feature.

4. A content distribution method comprising:
   registering personal information, a user identification, and biometric feature information regarding a user, in a registered user information table by making a connection there between;
   obtaining a user identification of a person who requests a content distribution and attaining from said registered user information table a first biometric feature information of said person based upon said user identification;
   measuring biometric features of said person and obtaining from said biometric feature second biometric feature information;
   performing a comparison between said second biometric feature information and said first biometric feature information read from said registered user information table;
   distributing a required content only when a match is made as a result of said comparison;
   measuring at the time of reproduction of the content distributed in said content distribution step, a biometric feature of a person who requests a content reproduction and attaining from said biometric feature third biometric feature information;
   performing a comparison between said third biometric feature information and said second biometric feature information; and
   allowing said person who has requested a content reproduction to use said content only when a match is made as a result of said comparison.

5. A content distribution method according to claim 4, wherein said content distributed to a user terminal includes at least one of music data, software for a video game, application software, and news items.

6. A content distribution method according to claim 4, wherein a fingerprint is used as said biometric feature.

7. A content distribution system comprising:
   at least one user terminal including a biometric feature input means; and
   a content distribution server to which said terminal is connected via a network, wherein said content distribution server includes:
   a registered user information table in which specific personal information, a user identification, and biometric feature information regarding a user are registered by making a connection therebetween, said personal information, user identification, and biometric feature information being inputted from said user terminal;
   first comparing means for reading, according to a user identification of a person who requests a content distribution inputted from said user terminal, first biometric feature information of said person from said registered user information table, for requesting said person to input second biometric feature information, and for performing a comparison between said second biometric feature information inputted from said user terminal in response to said input request and said first biometric feature information read from said table;
   content distribution means for distributing a required content to said user terminal only when match is made as a result of said comparison;
   biometric feature storage means for storing third biometric feature information of a registered user inputted at the time of registration to said registered user information table;
   content accumulation/reproduction means for accumulating and reproducing a content distributed from said content distribution means; and
   second comparing means for performing a comparison between fourth biometric feature information of a person who requests a content reproduction which has been inputted from said biometric feature input means and said third biometric feature information of said registered user stored in said biometric feature storage means, and for allowing said content accumulation/reproduction means to reproduce the distributed content only when a match is made as a result of said comparison.

8. A content distribution system according to claim 7, wherein said content to be distributed to said user terminal includes at least one of music data, software for a video game, application software, and news items.

9. A content distribution system according to claim 7, wherein a fingerprint is used as said biometric feature.

10. A computer readable medium having computer readable program code means embodied in said medium for performing control of a content distribution system, said code means implemented on a content distribution server and a user terminal, and comprising instructions for:

measuring a first biometric feature of a person who requests a content distribution;

performing a first comparison between first information associated with said first biometric feature obtained by the measurement and second information associated with biometric features of registered users which have been previously registered;

distributing a content only when match is made as a result of said first comparison;

measuring at the time of reproduction of the content distributed in said content distribution step, a second biometric feature of a person who requests a content reproduction;

performing a second comparison between third information associated with said second biometric feature obtained by the measurement and said first information; and allowing reproduction of said content only when match is made as a result of said second comparison.

11. A content distribution method comprising:

measuring a first biometric feature of a person who requests a content distribution;

performing a first comparison between said first biometric feature obtained by the measurement and biometric features of registered users which have been previously registered;

distributing a content when a match is made as a result of said first comparison;

measuring at the time of reproduction of the content distributed in said content distribution, a second biometric feature of a person who requests a content reproduction;

performing a second comparison between the second biometric feature obtained by the measurement and the first biometric feature; and allowing said person who has requested a content reproduction to use said content when a match is made as a result of said second comparison.

* * * * *